United States Patent
Sekiguchi et al.

(10) Patent No.: US 6,821,125 B2
(45) Date of Patent: Nov. 23, 2004

(54) PLANETARIUM

(75) Inventors: Takamasa Sekiguchi, Yamanashi (JP); Yasushi Kuwahara, Kofu (JP); Takeshi Sugamata, Yamanashi (JP)

(73) Assignee: Kabushikigaisya Goto Kogaku Kenkyujyo (JP)

( * ) Notice: Subject to any disclaimer, the term of this patent is extended or adjusted under 35 U.S.C. 154(b) by 0 days.

(21) Appl. No.: 10/128,635

(22) Filed: Apr. 23, 2002

(65) Prior Publication Data

US 2002/0160346 A1 Oct. 31, 2002

(30) Foreign Application Priority Data

Apr. 26, 2001 (JP) .................................... 2001-130448

(51) Int. Cl.[7] .............................................. G09B 23/00
(52) U.S. Cl. ..................... 434/284; 434/285; 434/291
(58) Field of Search ................................ 434/284, 287, 434/288, 290, 291

(56) References Cited

U.S. PATENT DOCUMENTS

| | | | | |
|---|---|---|---|---|
| 3,029,528 A | * | 4/1962 | Verson | 434/291 |
| 3,521,384 A | * | 7/1970 | Holland | 434/291 |
| 3,571,954 A | * | 3/1971 | Frank | 343/286 |
| 3,753,300 A | * | 8/1973 | Mosley | 434/286 |
| 3,879,862 A | * | 4/1975 | Chin | 434/288 |
| 4,588,384 A | * | 5/1986 | Shiba | 434/286 |
| 4,639,224 A | * | 1/1987 | Maejima et al. | 434/286 |
| 5,194,009 A | * | 3/1993 | Bertsche | 434/286 |
| 5,344,325 A | * | 9/1994 | Wang | 434/288 |
| 5,492,475 A | * | 2/1996 | Hattori | 434/286 |
| 5,717,529 A | * | 2/1998 | Scharf | 359/739 |
| 6,033,230 A | * | 3/2000 | Shiotsu et al. | 434/286 |
| 6,499,846 B1 | * | 12/2002 | Hiller et al. | 353/50 |

FOREIGN PATENT DOCUMENTS

| | | |
|---|---|---|
| JP | 37-3218 | 9/1935 |
| JP | 60-39675 | 3/1985 |
| JP | 60-230682 | 11/1985 |

* cited by examiner

Primary Examiner—Kurt Fernstrom
(74) Attorney, Agent, or Firm—Lackenbach Siegel LLP

(57) ABSTRACT

A planetarium has a planet projection system comprising: a rotatable stage positioned concentrically with a precession axis of a fixed star projection globe and performing an X-axis motion; and a sleeve-type planet projector positioned at an eccentric position with respect to an X axis on the rotatable stage and performing a Y-axis motion for allowing a projection direction to vary upward and downward in relation to the rotatable stage. The X-axis and Y-axis motions are controlled on the basis of values calculated by a planet-movement operation unit receiving date and time data, to project the movement of planets.

17 Claims, 10 Drawing Sheets

PLANETARIUM

BACKGROUND OF THE INVENTION

1. Field of the Invention

This invention relates to a planetarium and, more particularly, to an improved planet projection system for a planetarium.

2. Description of Related Art

Conventional schemes for a planet projection system to drive each of sleeve-type planet projectors for reproducing and projecting the movement of planets, i.e. the inconstant velocity elliptic motion (Keplerian motion) of planets, include: a mechanical scheme in which an annual driving shaft is associated with each of sleeve-type planet projectors through a gear train for driving them; a modeling control scheme in which a driving apparatus operates a gear train for controlling a planet projection system, which is a receiver, by control signals transmitted from an apparatus for reproducing the inconstant velocity elliptic motion (Keplerian motion) (e.g., Japanese Patent Publication No. 37-3218); and a computer scheme in which each of sleeve-type planet projectors is driven in a biaxially control on the basis of calculated values (e.g., Japanese Patent Laid-open No. 60-39675, Japanese Patent Laid-open No. 60-230682).

In the mechanical and modeling control schemes of such schemes in prior art, the planet projector is continuously driven through the gear train to reproduce the movement of planets. Accordingly, for the projection of a travel position of a planet at a desired time in the past or future, the gear train must be rotated by turns corresponding to a time period from the time of the present position of the target planet to the required time. For example, the moving for one hundred years might take as much as 30 minutes. Further, the use of gears does not allow the smooth moving of each planet projector, which may cause a wobbly projected image and noise. Still further, because a revolution period of a planet is not an integer number, the use of the gear train imposes a limitation on the reproduction of planets. Reproducing the movement of the planets within a range of a long time period involves the inevitable problem of the occurrence of cumulative error.

In the latter computer scheme, since the sleeve-type planet projector is biaxially controlled by using the X- and Y-axes intersecting at right angles, assuming that a plurality of planet projectors are provided, it is difficult to provide a vertical arrangement of the planet projectors on a fixed star projection globe. Because of this, as disclosed in the aforementioned Japanese Patent Laid-open No. 60-230682, the planet projection system must be located at a distance from the fixed star projection globe. This leads to a reduction in the number of seats due to the installation space of the planet projection system, and also to the eclipse of light flux emitted from the planet projector. Further, since a main computer calculates the signals for driving the planet projector, trouble occurring in the main produces a problem of the impossibility of the planet projection.

SUMMARY OF THE INVENTION

It is an object of the present invention to provide a planetarium having a planet projection system overcoming the aforementioned problems associated with the prior art.

The present invention provides a planetarium comprising a fixed star projection globe, a main computer and a planet projection system. The planet projection system comprises: a rotatable stage rotatably mounted on a fixed shaft, positioned concentrically with a precession axis of the fixed star projection globe or positioned in proximity and parallel to the precession axis, to perform an X-axis motion; at least one sleeve-type planet projector positioned at an eccentric position with respect to an X axis on the rotatable stage and provided for a Y-axis motion for allowing a projection direction to vary upward and downward in relation to the rotatable stage; and a planet-movement operation unit for receiving date and time data from the main computer and controlling the X-axis motion and the Y-axis motion on the basis of the received date and time data.

The present invention configured as described above has the unique effects described below.

1) The rotatable stage is rotatably mounted on the fixed shaft, positioned concentrically with the precession axis of the fixed star projection globe or positioned in proximity and parallel to the precession axis, to achieve an X-axis motion. The sleeve-type planet projector is mounted on such a rotatable stage. This configuration. allows the planet projection system to operate in synchronization with a diurnal motion, a latitude rotation motion, and a rotation frame motion of the fixed star projection globe to prevent a projected position of a planet from deviating with respect to a projected position of a fixed star. Thus, the unnaturalness in star-field reproduction which is a disadvantage in the prior art can be avoided.

2) For the same reason, the eclipse of light during the projection is not produced.

3) Regardless of the adoption of the aforementioned construction, without relying on the driving scheme of each planet projector by the use of a gear train, the present invention achieves success in the adoption of a scheme of driving each of the planet projectors under biaxial control on the basis of calculated values. Hence, the present invention allows the projection in a short time even in the reproduction of a long-time movement of a planet. Further, high-accuracy reproduction is permitted because of an easy position correction by calculation.

4) The projection of the movement of planets is not controlled by a main computer directing the control of the entire planetarium as in the case of the prior art, but is controlled by a planet-movement operation unit isolated from the main computer. This configuration allows the dispersion of the load of processing and the control for the planet projection system even when trouble occurs in the main computer.

DETAILED DESCRIPTION OF THE PREFERRED EMBODIMENTS

Figure 1:
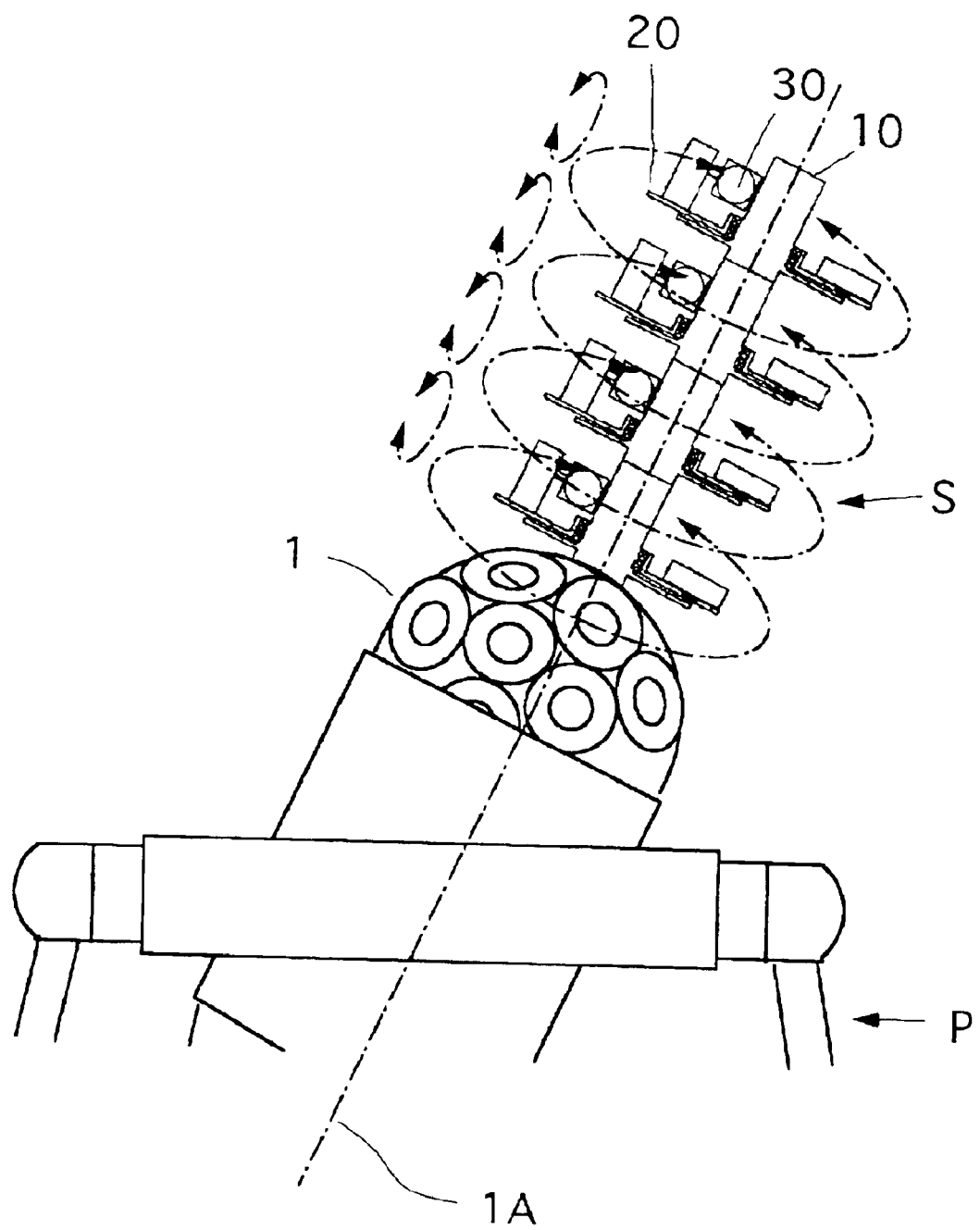
FIG. 1 is an essentially partial side view of a planetarium according to the present invention.

Preferred embodiments according to the present invention will be described hereinafter in detail with reference to the accompanying drawings. FIG. 1 illustrates a planet projection system of a planetarium according to the present invention. In FIG. 1, a fixed star projection globe 1 is movably supported by a frame of a planetarium body P. A planet projection system S includes a fixed shaft 10; a rotatable stage 20 mounted rotatably about the fixed shaft 10 to perform an X-axis motion; and a sleeve-type planet projector 30 placed on the rotatable stage 20 and provided for a Y-axis motion allowing a projection direction to vary upward and downward. The fixed shaft 10 is fixed to the fixed star projection globe 1. In the embodiment, the fixed shaft 10 is positioned concentrically with a precession axis 1A of the fixed star projection globe 1, but it may be positioned in proximity to the precession axis, in which case the fixed shaft 10 is desirably placed in parallel to the precession axis. In the embodiment the fixed shaft 10 is detachably attached to the fixed star projection globe 1 by any proper means. Although FIG. 1 illustrates only the fixed star projection globe for the northern hemisphere, another planet projection system S is similarly mounted to a fixed star projection globe for the southern hemisphere. The present invention is applicable to other conventional type planetariums such as those including a gear-type planet projection mechanism between the two fixed star projection globes for the northern and southern hemispheres.

The rotatable stages 20 mounted rotatably about the fixed shaft 10 are arranged in plurality in the X-axis direction as illustrated in FIG. 1. In the embodiment the fixed shaft 10 for supporting the rotatable stages 20 is designed to be divided into detachable parts each holding a rotatable stage, and these parts of the fixed shaft 10 are attached to each other by attaching/detaching means as used for attaching to the fixed star projection globe.

Figure 2:
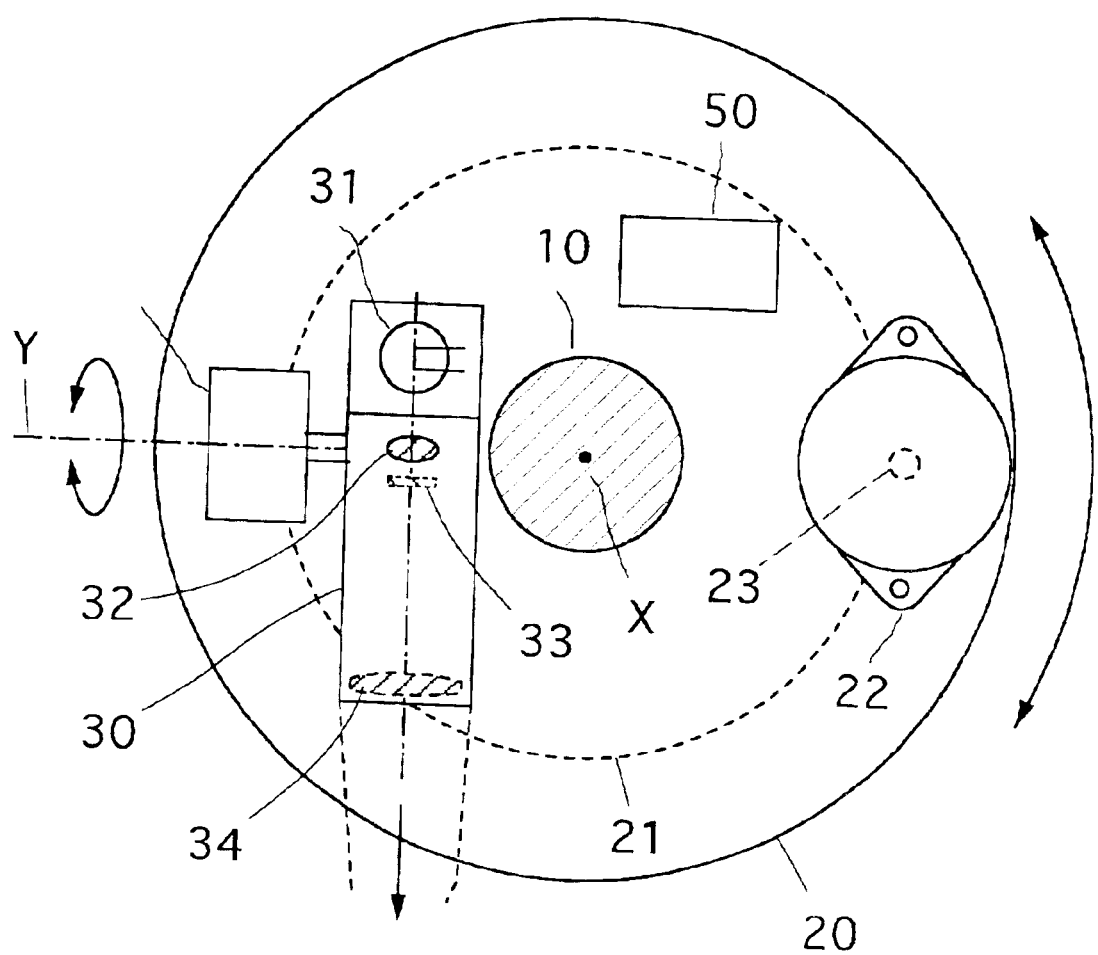
FIG. 2 is a partial cut-away plan view of a rotating stage of the planetarium in FIG. 1.
Figure 3:
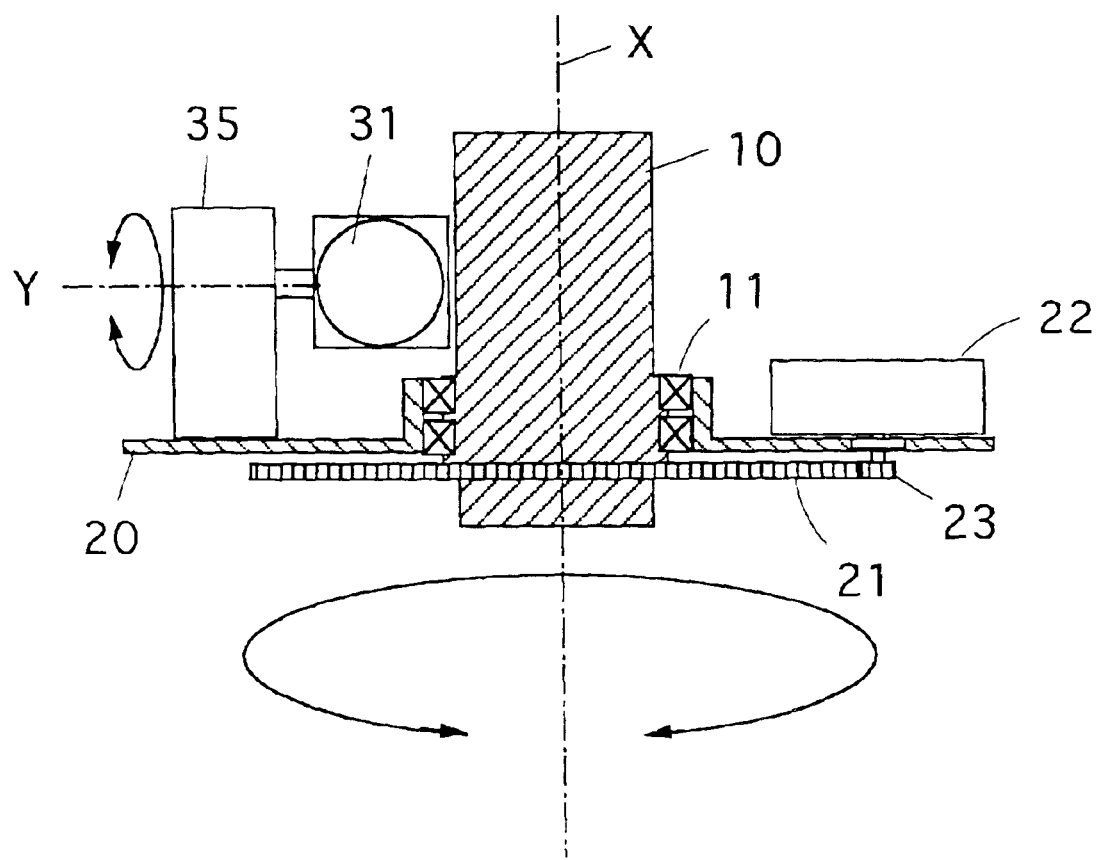
FIG. 3 is a partial cut-away side view of a rotating stage of the planetarium in FIG. 1.

FIG. 2 and FIG. 3 illustrate the rotatable stage 20 in detail. In the embodiment the rotatable stage 20 is mounted rotatably on and diametrically around the outer periphery of the fixed shaft 10 through a bearing 11. And also a large gear 21 is fitted diametrically around the outer periphery of the fixed shaft 10, and engaged with a gear 23, which is driven by an X-axis motion motor 22 placed at an eccentric position on the rotatable stage, to form a gear mechanism. The gear mechanism rotates the rotatable stage 20 to any given position. In another method, the X-axis motion can be driven by a driving scheme utilizing friction or a mechanism using an interposed belt, which are not shown.

Figure 4:
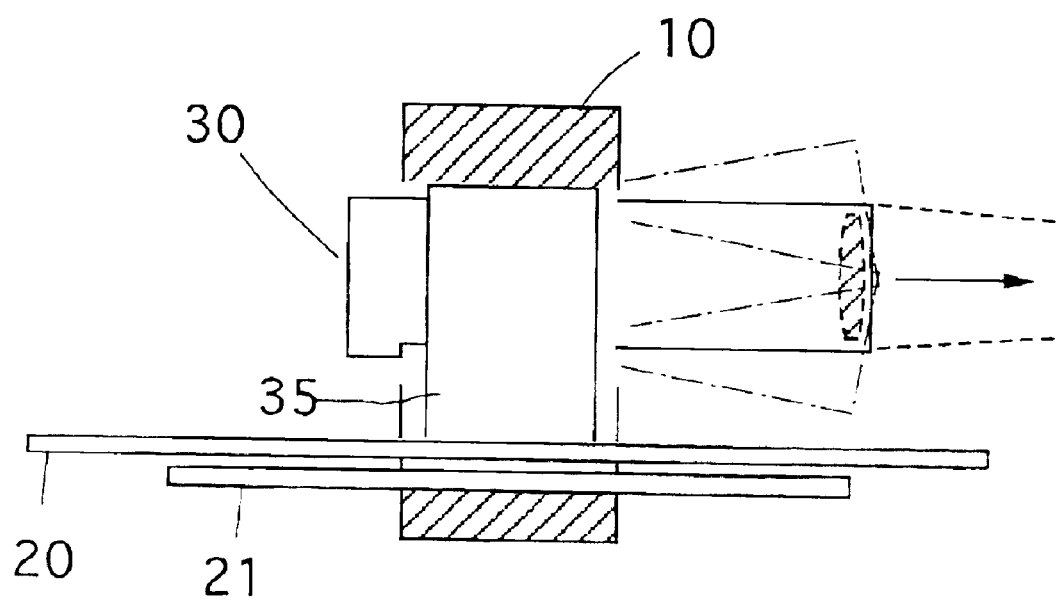
FIG. 4 is a partial cut-away side view of a rotating stage of the planetarium in FIG. 1.
Figure 5:
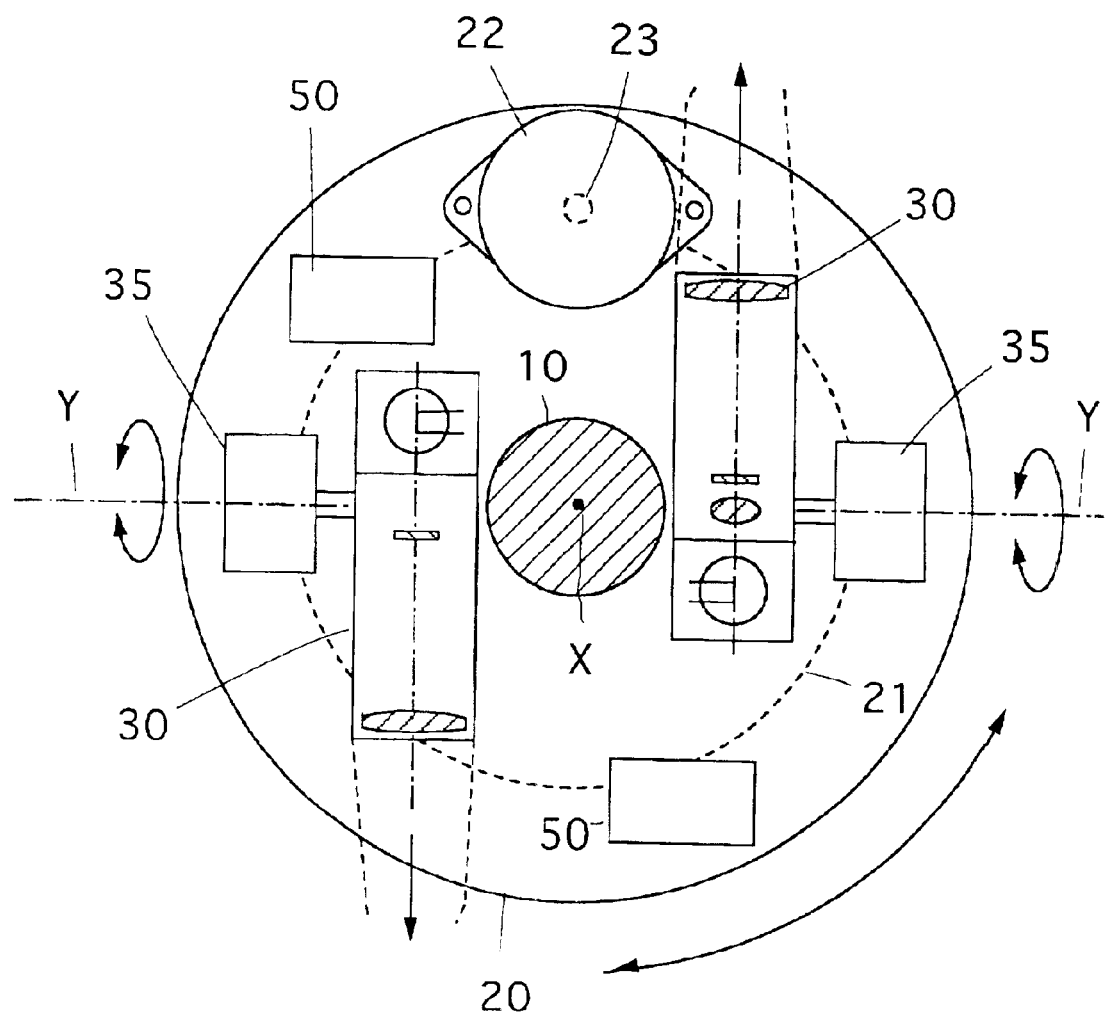
FIG. 5 is a partial cut-away plan view of a rotating stage in another embodiment of the planetarium in FIG. 1.

The sleeve-type planet projector 30 incorporates an electric lamp 31, a condenser lens 32, an original plate 33 and a projection lens 34, which is a well-known structure. The planet projector 30 is placed at an eccentric position on the rotatable stage 20 with respect to the X axis, and is designed to perform the Y-axis motion for allowing a projection direction to vary upward and downward in relation to the corresponding rotatable stage. In the embodiment, a Y-axis motion motor 35 is provided on the rotatable stage as means for varying the projection direction upward and downward, which turns the planet projector 30 in the vertical direction to provide the Y-axis motion to the planet projector itself (see FIG. 4). The planet projectors 30 can be mounted in plurality on each rotatable stage 20. FIG. 5 illustrates an example of providing two projectors 30 on a single stage 20.

Figure 6:
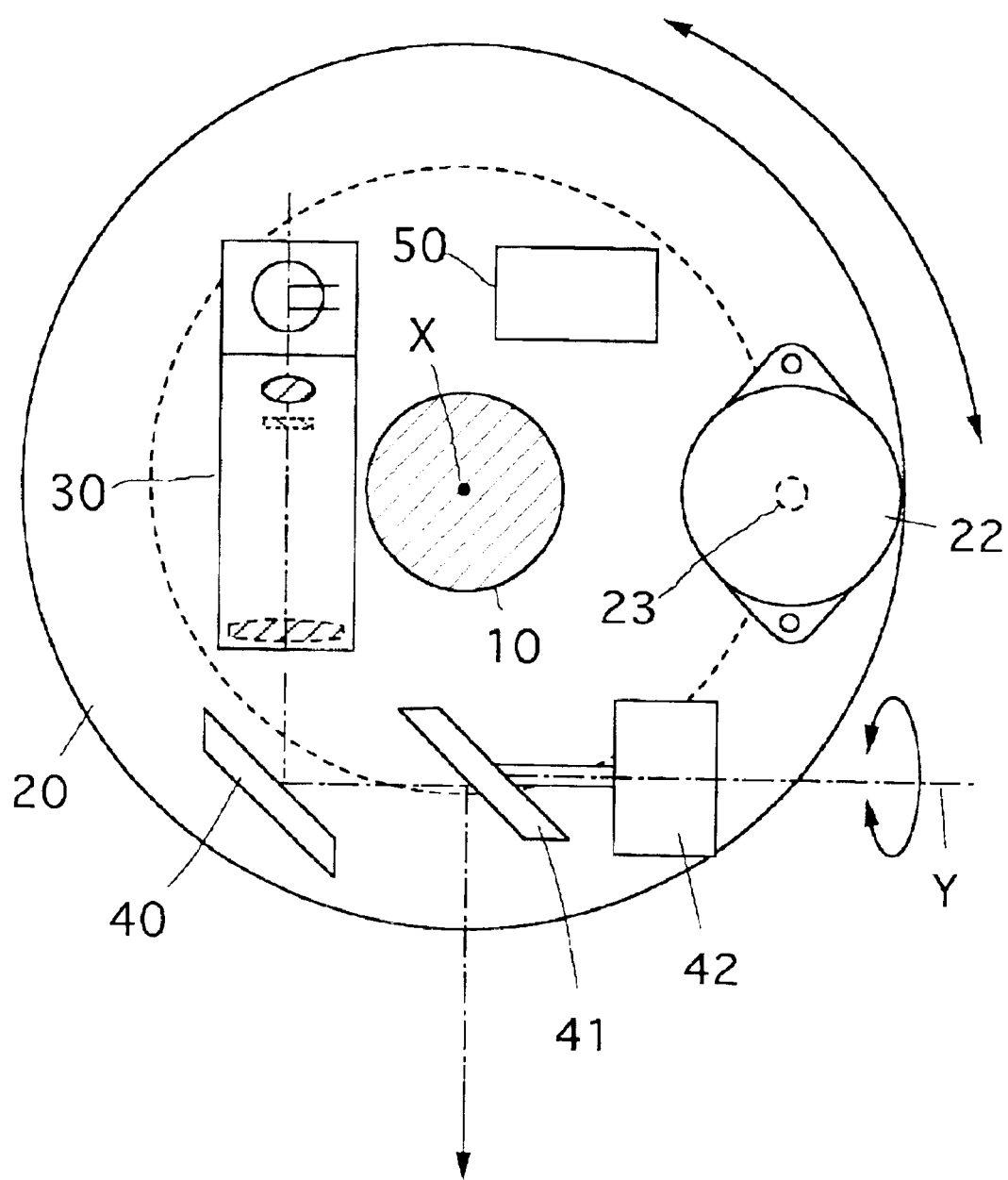
FIG. 6 is a partial cut-away plan view of a rotating stage in yet another embodiment of the planetarium in FIG. 1.

FIG. 6 illustrates another embodiment differing in the Y-axis motion for allowing the projection direction of the planet projector 30 to vary upward and downward. In the embodiment of FIG. 6, a mirror is provided for reflecting light flux projected from the planet projector, and provided with the Y-axis motion to serve as the means for varying the projection direction upward and downward. Specifically, light flux projected from the planet projector 30 fastened on the rotatable stage 20 travels, through the medium of a stationary mirror 40 positioned forward of the planet projector 30, to a rotatable mirror 41, and then is reflected by the rotatable mirror 41 to vary the projection direction upward and downward. FIG. 6 also illustrates a Y-axis motion motor 42 for rotating the rotatable mirror 41. In the aforementioned embodiment in which the planet projector 30 is turned in the vertical direction, a large amount of vertical movement of the planet projector requires a large space between neighboring rotatable stages. In the scheme according to the embodiment using such mirrors, however, a small amount of vertical movement of the mirror itself allows a decrease in space between neighboring rotatable stages. In addition, the small mass of a movable portion requires only a small amount of power, and further the accuracy is improved.

Figure 7:
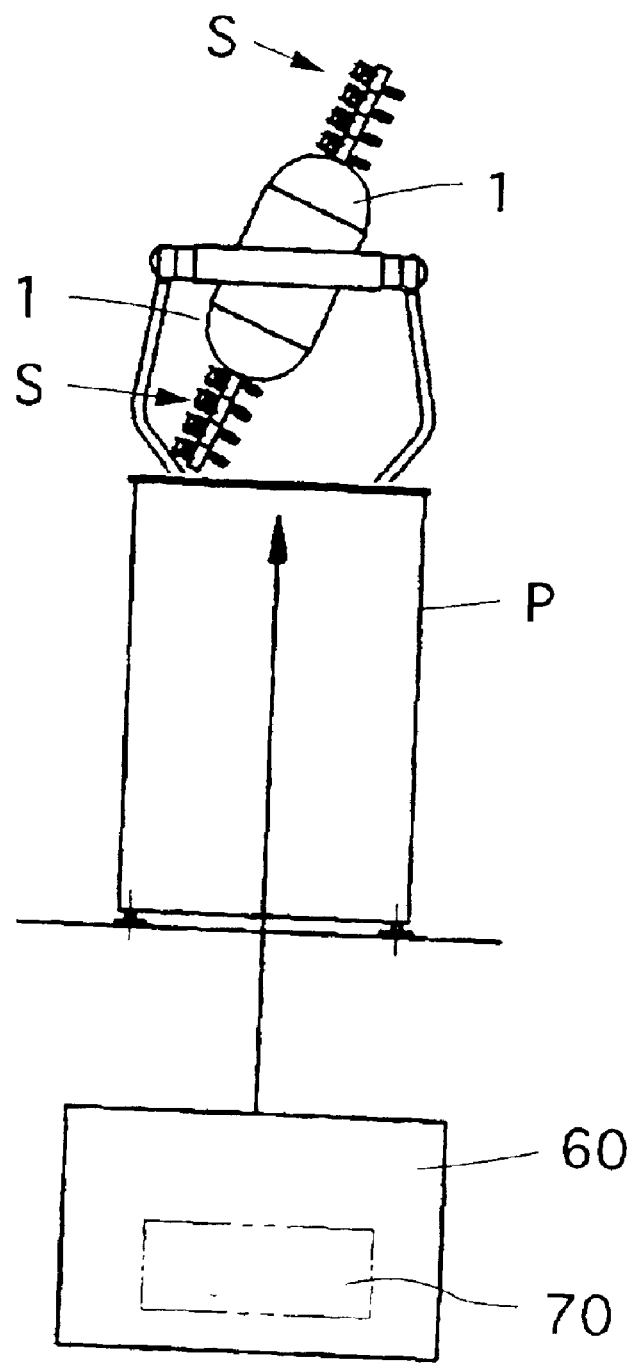
FIG. 7 is a side view of a planetarium according to the present invention.
Figure 8:
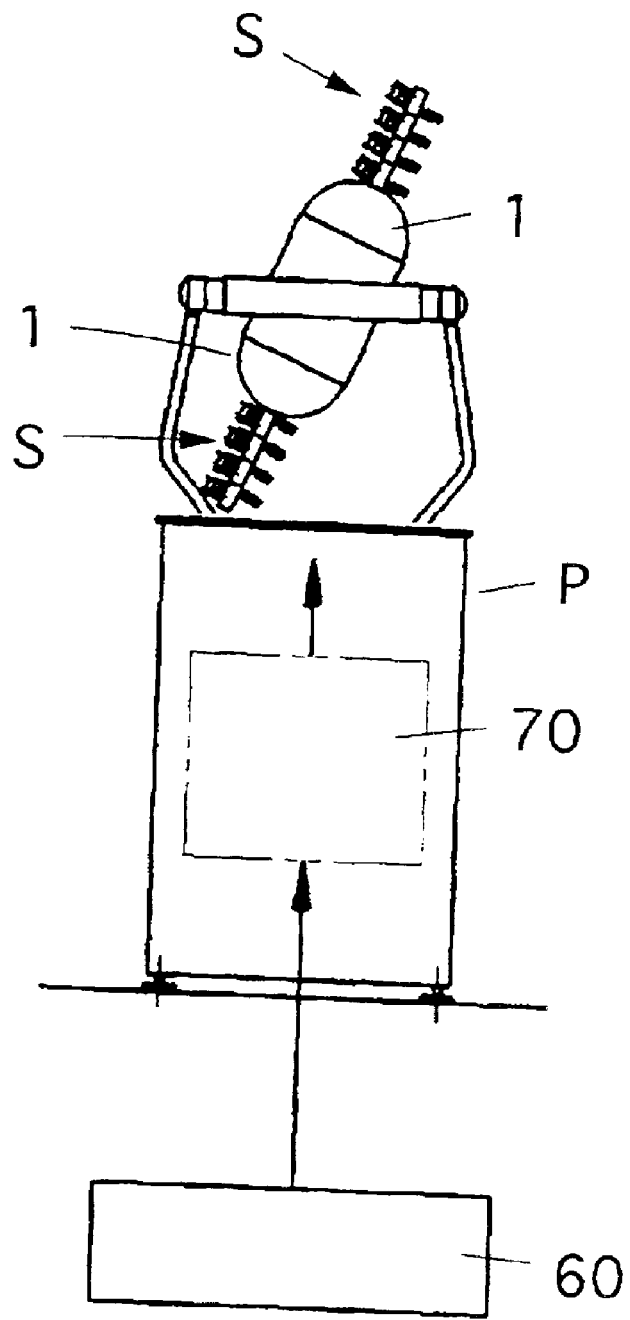
FIG. 8 is a side view of another embodiment of the planetarium in FIG. 7.

In the planet projection system S as described above, each of the planet projectors 30 projects a planet image at any given position on a dome by means of a combination of the X-axis motion caused by the rotation of the rotatable stage and the Y-axis motion causing variations of the projection direction upward and downward. In the present invention, such projection of the movement of planets is not controlled by a main computer directing the control of the entire planetarium as in the case of the prior art, but is controlled by means of a planet-movement operation unit provided for receiving date and time data from the main computer and performing calculations on the basis of the received date and time data to control the X-axis and Y-axis motion motors. FIG. 7 illustrates an example of the placement of the planet-movement operation unit in the case of such control, in which a single planet-movement operation unit 70 is provided for managing and controlling all X-axis motion motors and Y-axis motion motors of the planet projection system S in a unified way, and mounted on a main computer 60. Alternatively, as illustrated in FIG. 8, the planet-movement operation unit 70 may be isolated from the main computer 60 and installed in the planetarium body P.

Further, instead of providing a single planet-movement operation unit for managing and controlling all X-axis and Y-axis motion motors in a unified way as described above, a planet-movement operation unit can be provided on each rotatable stage. In the aforementioned embodiments illustrated in FIG. 1 to FIG. 6, a planet-movement operation unit 50 of the later type is mounted on each rotatable stage. Each of the planet-movement operation units 50 calculates the projection direction of each planet on the basis of the date and time data received from the main computer 60, and sends drive signals to the X-axis motion and Y-axis motion motors through a controller (not shown). With this design, even when trouble occurs in the main computer 60, the projection of planets can be performed by way of connecting the planet-movement operation unit to an unsophisticated external controller which is capable of transmitting the date and time data. Likewise, during the occurrence of trouble in or maintenance of the planetarium body, the planet-movement operation unit can be also operated independently. Since the X-axis motion and Y-axis motion motors are placed on the rotatable stage, a signal current is supplied to each motor through a slip ring (not shown).

Figure 9:
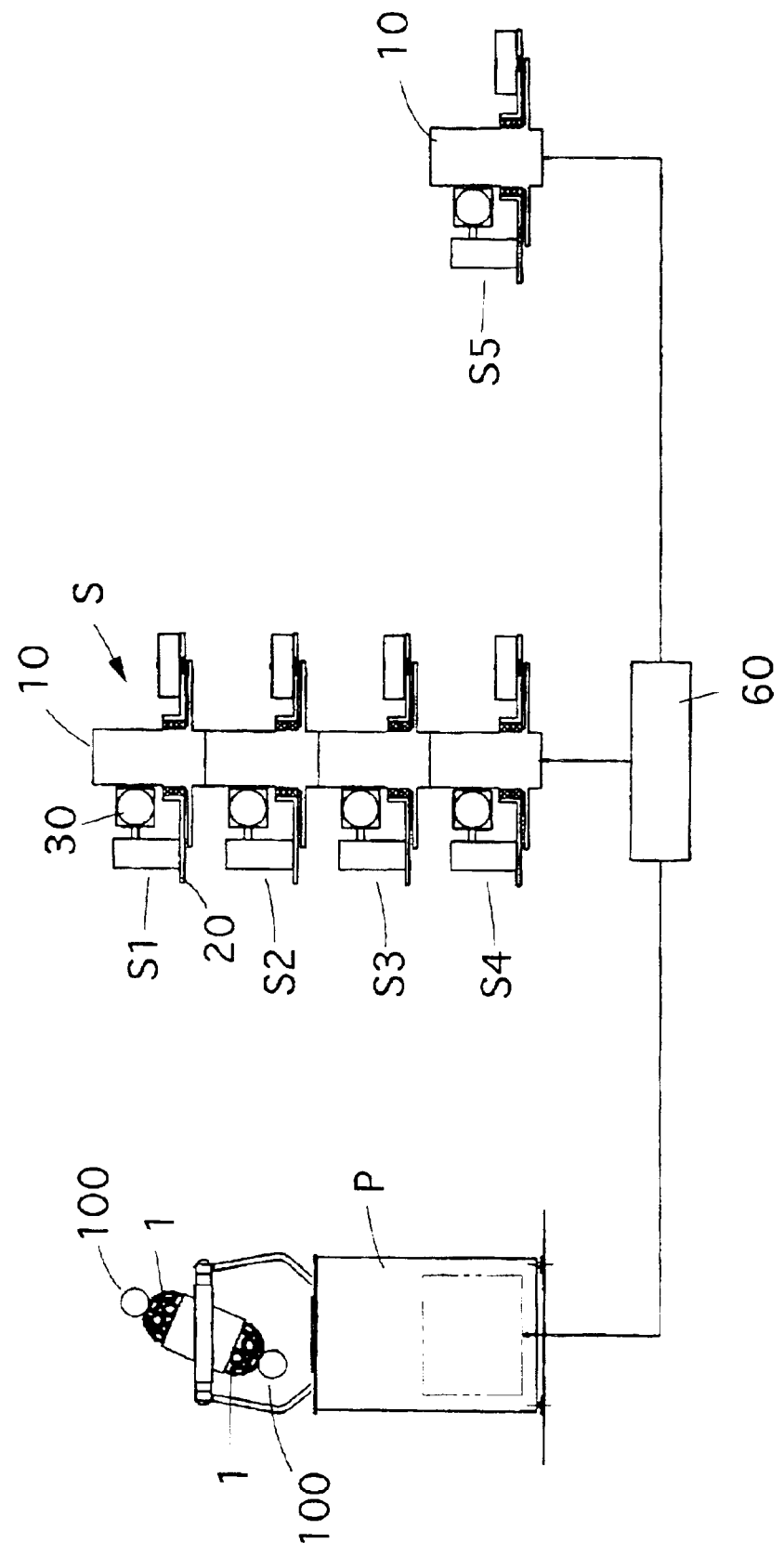
FIG. 9 is a side view illustrating a usage example of the planetarium in FIG. 7.

FIG. 9 illustrates an example when the planet projection system S is isolated from the fixed star projection globe 1 and divided in units of a rotatable stage, in accordance with the present invention. In this example, the fixed star projection globe 1 from which the planet projection system S has been removed may be fitted with an auxiliary projection apparatus 100 for showing, e.g., a constellation pattern, instead of the planet projection system S.

Figure 10:
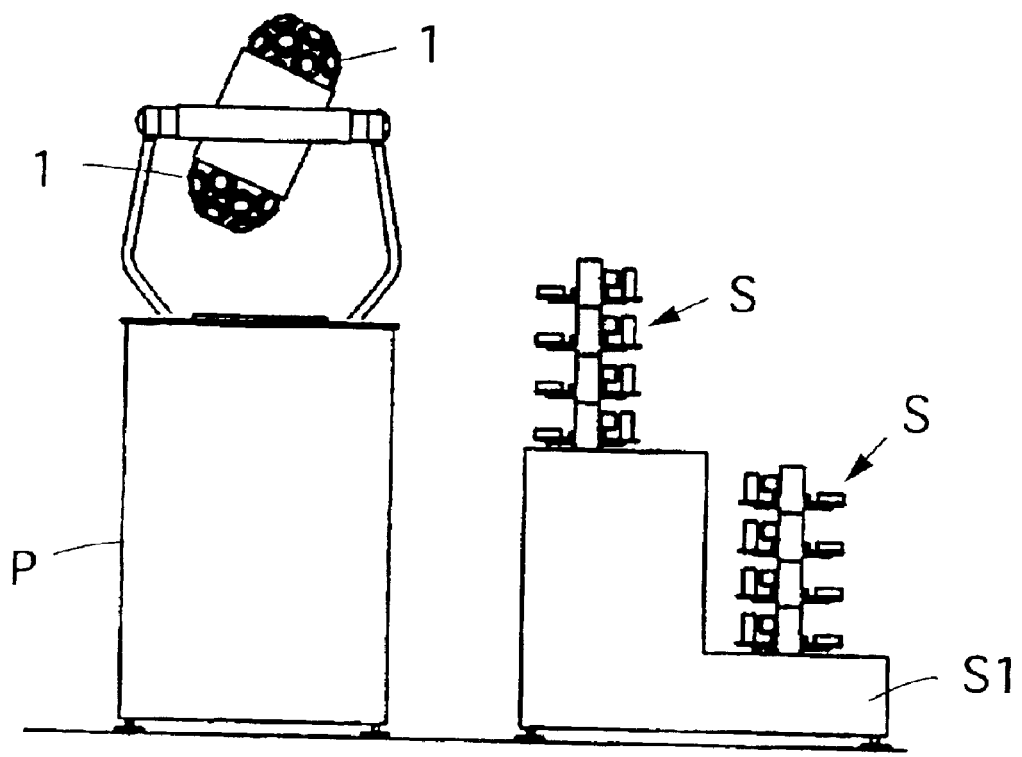
FIG. 10 is a side view illustrating another usage example of the planetarium in FIG. 7.

FIG. 10 illustrates an example when the planet projection system S is removed from the fixed star projection globe 1 and is independently seated on a pedestal S1, sited in the planetarium facility, for the projection of planets in accordance with the present invention. These examples need a process of directing a planet-movement operation unit 60 to perform calculations including the amount of eccentricity between the center position (an intersection point of a diurnal axis, latitude axis and precession axis) of the planetarium body P, and an intersection point of a rotatable stage operated in the planet projection system S and the X axis, to synchronize the movement of planets with that of the main planetarium for the projection of the planets. In the example in FIG. 10, the fixed shaft 10 of the planet projection system S separated from the planetarium body is vertical, but it may be set to be horizontal or inclined so as to be parallel to the precession axis of the planetarium body P.

What is claimed is:

1. A planetarium, comprising:
   a fixed star projection globe;
   a main computer; and
   a planet projection system, including:
   a rotatable stage rotatably mounted on a fixed shaft, positioned concentrically with a precession axis of the fixed star projection globe or in proximity and parallel to the precession axis, to perform an X-axis motion;
   at least one sleeve planet projector positioned at an eccentric position with respect to an X axis on said rotatable stage and provided for a Y-axis motion for allowing a projection direction to vary upward and downward in relation to said rotatable stage; and
   a planet-movement operation unit for receiving date and time data from the main computer and controlling the X-axis motion and the Y-axis motion on the basis of the received date and time data.

2. A planetarium according to claim 1, wherein said rotatable stage has said sleeve planet projector mounted thereon are arranged in plurality in the X-axis direction.

3. A planetarium according to claim 2, wherein said planet projection system including said rotatable stage has said sleeve planet projector mounted thereon, and said fixed shaft for rotatably supporting the rotatable stage is detachably attached to the fixed star projection globe.

4. A planetarium according to claim 2, wherein said individual planet-movement operation unit for controlling the X-axis motion of said rotatable stage and the Y-axis motion for the projection direction of said sleeve planet projector mounted on the rotatable stage is provided on each rotatable stage having said sleeve planet projector mounted thereon.

5. A planetarium according to claim 1, wherein said individual planet-movement operation unit for controlling the X-axis motion of said rotatable stage and the Y-axis motion for the projection direction of said sleeve planet projector mounted on the rotatable stage is provided on each rotatable stage having said sleeve-type planet projector mounted thereon.

6. A planetarium according to claim 5, wherein said planet projection system including said rotatable stage has said sleeve-type planet projector mounted thereon, and said fixed shaft for rotatably supporting the rotatable stage is detachably attached to the fixed star projection globe.

7. A planetarium according to claim 1, wherein the Y-axis motion is imparted to said sleeve planet projector itself to allow the sleeve planet projector to serve as means for varying the projection direction upward and downward.

8. A planetarium according to claim 7, wherein and rotatable stage has said sleeve planet projector mounted thereon are arranged in plurality in the X-axis direction.

9. A planetarium according to claim 7, wherein said individual planet-movement operation unit for controlling the X-axis motion of said rotatable stage and the Y-axis motion for the projection direction of said sleeve planet projector mounted on the rotatable stage is provided on each rotatable stage having said sleeve-type planet projector mounted thereon.

10. A planetarium, comprising;
    a fixed star projection globe;
    a main computer; and
    a planet projection system, including:
    a rotatable stage rotatably mounted on a fixed shaft, positioned concentrically with precession axis of the fixed star projection globe or in proximity and parallel to the precession axis, to perform an X-axis motion;
    at least one sleeve planet projector positioned at an eccentric position with respect to an X axis on said rotatable stage and provided for a Y-axis motion for allowing a projection direction to vary upward and downward in relation to said rotatable stage; and
    a planet-movement operation unit for receiving date and time data from the main computer and controlling the X-axis motion and the Y-axis motion on the basis of the received date and time data, wherein said planet projection system including said rotatable stage has said sleeve planet projector mounted thereon, and said fixed shaft for rotatably supporting the rotatable stage is detachably attached to the fixed star projection globe.

11. A planetarium according to claim 10, wherein said fixed shaft for supporting said rotatable stages having said sleeve planet projectors mounted thereon is divided into parts each holding said rotatable stage in such a manner as to allow the divided parts to be attached detachably to each other by attaching/detaching means as used for attaching to the fixed star projection globe, to make said planet projection system dividable.

12. A planetarium according to claim 7, wherein said planet projection system including said rotatable stage has said sleeve planet projector mounted thereon, and said fixed shaft for rotatably supporting the rotatable stage is detachably attached to the fixed star projection globe.

13. A planetarium according to claim 1, further comprising a mirror reflecting light flux projected from said sleeve planet projector, and provided with the Y-axis motion to serve as means for varying the projection direction upward and downward.

14. A planetarium according to claim 13, wherein said rotatable stage has said sleeve planet projector mounted thereon are arranged in plurality in the X-axis direction.

15. A planetarium according to claim 13, wherein said individual planet-movement operation unit for controlling the X-axis motion of said rotatable stage and the Y-axis motion for the projection direction of said sleeve planet projector mounted on the rotatable stage is provided on each rotatable stage having said sleeve-type planet projector mounted thereon.

16. A planetarium according to claim 13, wherein said planet projection system including said rotatable stage has said sleeve planet projector mounted thereon, and said fixed shaft for rotatably supporting the rotatable stage is detachably attached to the fixed star projection globe.

17. A planetarium, comprising:

a fixed star projection globe;

a main computer; and a planet projection system, including:

a plurality of rotatable stages rotatably mounted on a centrally disposed fixed shaft, said shaft comprising a plurality of segments, each rotatable stage being operably attached to a respective segment, positioned concentrically with a precession axis of the fixed star projection globe or in proximity and parallel to the precession axis, to perform an X-axis motion;

at least one sleeve planet projector positioned at an eccentric position with respect to an X axis on said rotatable stage and provided for a Y-axis motion for allowing a projection direction to vary upward and downward in relation to said rotatable stage; and a planet-movement operation unit for receiving date and time data from the main computer and controlling the X-axis motion and the Y-axis motion on the basis of the received date and time data.

* * * * *